United States Patent Office 3,346,837
Patented Oct. 10, 1967

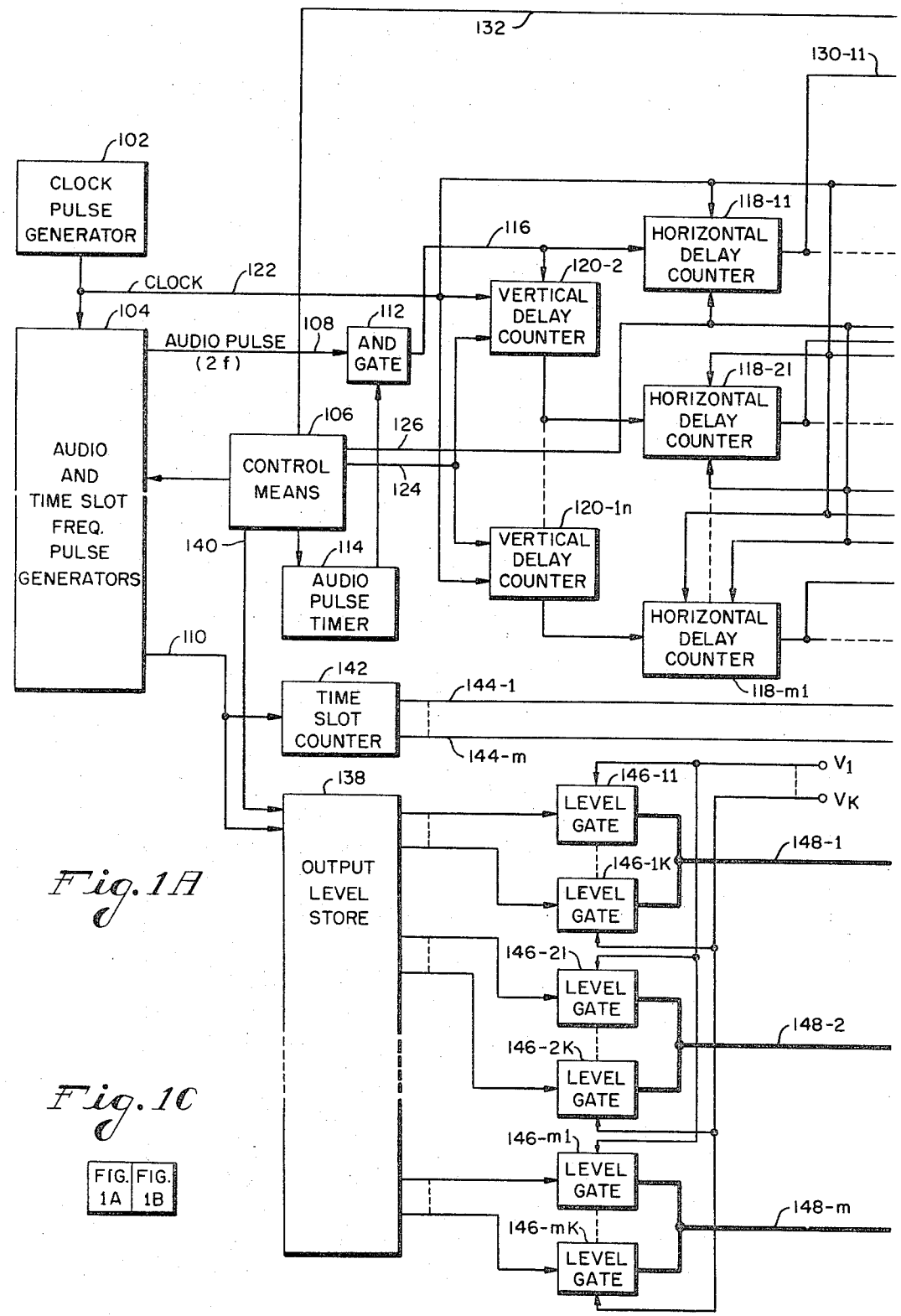

3,346,837
DELAY COUNTER PHASE CONTROL SYSTEM FOR USE IN PRODUCING A VARIABLE DIRECTION BEAM FROM A FIXED TRANSMITTING ARRAY
Uwe A. Pommerening, Webster, N.Y., assignor to General Dynamics Corporation, Rochester, N.Y., a corporation of Delaware
Continuation of application Ser. No. 412,956, Nov. 23, 1964. This application Oct. 18, 1966, Ser. No. 587,622
22 Claims. (Cl. 340—5)

ABSTRACT OF THE DISCLOSURE

This disclosure describes a system for producing a radiation pattern from a two-dimensional array of transmitting underwater sound transducers and varying the direction of the pattern. In order to change the direction of the pattern, the time delay between the waves radiated from the transducers in the array is varied. This time delay is obtained by means of a group of vertical counters and groups of horizontal counters corresponding to the transducers in the array. Each counter selectively counts clock pulses. The counters are connected in series in a matrix arrangement so that the preceding counter output provides inputs to its succeeding counter. In this manner, each counter produces an output pulse after a time delay which depends upon the desired pattern direction and which time delay can be changed, in order to change the pattern direction. The output of each counter is applied to a line circuit and translated into the waves which drives its corresponding transducer.

This application is a continuation of application Ser. No. 412,956, filed Nov. 23, 1964 and now abandoned.

This invention relates to a phase control system and, more particularly, to such a system for producing a variable direction beam from a fixed transmitting array.

It is well known that a fixed transmitting array, such as an array composed of a plurality of stationary sonor transducers, may be utilized to transmit a directional beam of energy at any transmitting frequency, the direction of the beam being a function of the relative phase difference of the respective signals of the transmitting frequency applied to the respective transducing elements making up the array.

For instance, if signals having the same frequency and phase are applied to each transducer of a planar array of equally spaced transducers arranged in rows and columns, the array will transmit a broadside beam in a direction perpendicular to the planar array. On the other hand, if the phase of the signal applied to the respective transducers of each column is delayed by a time interval with respect to the phase of the signal applied to the respective transducers of the column immediately to its left which time interval is equal to the distance between adjacent transducers in each row divided by the velocity of propagation of the transmitted energy in the medium surrounding the transducers, an end-fire beam substantially parallel to the planar array will be propagated to the right. Similarly, if this time delay is more than zero, but is less than that necessary to produce an end-fire beam, a beam of energy will be propagated at some azimuth angle in the first quadrant which angle is a function of this time delay. In like manner, if the phase of the signal applied to the transducers of each column is delayed by an appropriate time interval with respect to the phase of the signal applied to the transducers of the column immediately to its right, a beam of energy will be propagated at some azimuth angle in the second quadrant. Just as the azimuth angle may be controlled by controlling the relative time delay between adjacent columns of a planar array, the elevation angle may be controlled by controlling the relative time delay between adjacent rows of a planar array.

The reason that a directional beam is produced is that wave energy transmitted by each of the transducers will algebraically add up to re-enforce each other in only a certain direction which depends solely on the positions of the transducers in the array and the relative phase difference existing between signals applied to adjacent transducers. In all other directions, the wave energy transmitted from each of the respective transducers of the array will algebraically add up to cancel each other.

Although in the above discussion it has been assumed that the fixed array is a planar array, this is not necessarily the case. It is possible by properly choosing the positions of the transducers in a non-linear, non-planar array, in a manner to be described in detail below, and by inserting preselected fixed phase delays in the signals applied to the transducers thereof to produce a virtual planar array which is displaced and/or rotated with respect to the actual array. Such a virtual planar array at a predetermined angle with respect to an actual planar array may also be produced by inserting preselected fixed phase delays in the signals applied to the transducers thereof.

Since in most cases it is desirable to produce a directional beam of relatively narrow width, and a beam becomes narrower as the number of transducers in the transmitting array increases, it is often necessary to provide an array consisting of several hundred columns and rows of transducers in order to produce a beam of sufficient directivity. This requires that the minimum phase difference in the signals applied to the transducers of the various columns and rows be quite small, in the order of one degree or less.

It will be appreciated that with ordinary space division techniques it is quite difficult and expensive to provide each one of hundreds of transducers with a sinusoidal signal of a transmitting frequency which is accurately phased to a fraction of one degree for each selected one of a relatively large plurality of different available beam directions. This problem has limited the use of fixed transmitting arrays for producing a variable direction beam.

The present invention contemplates the utilization of time division multiplex techniques and, more particularly, the use of delay counters to produce the multiplicity of needed sinusoidal signals of different phases. Furthermore, for proper beam forming the relative levels of sinusoidal signals applied to the various transducers must be controlled. Time division multiplex techniques are also utilized for such level control.

It is therefore an object of the present invention to provide an improved phase control system for producing a variable direction beam from a fixed transmitting array.

It is a further object of the present invention to provide such a phase control system utilizing time division multiplex techniques.

It is a still further object of the present invention to provide such a time division multiplex phase control system incorporating delay counters.

These and other objects, features and advantages of the present invention will become more apparent from the following detailed description, taken together with the accompanying drawings, in which:

FIGS. 1A and 1B, when placed next to each other as shown in FIG. 1C, illustrate a block diagram of a preferred embodiment of the present invention;

Figure 1B:
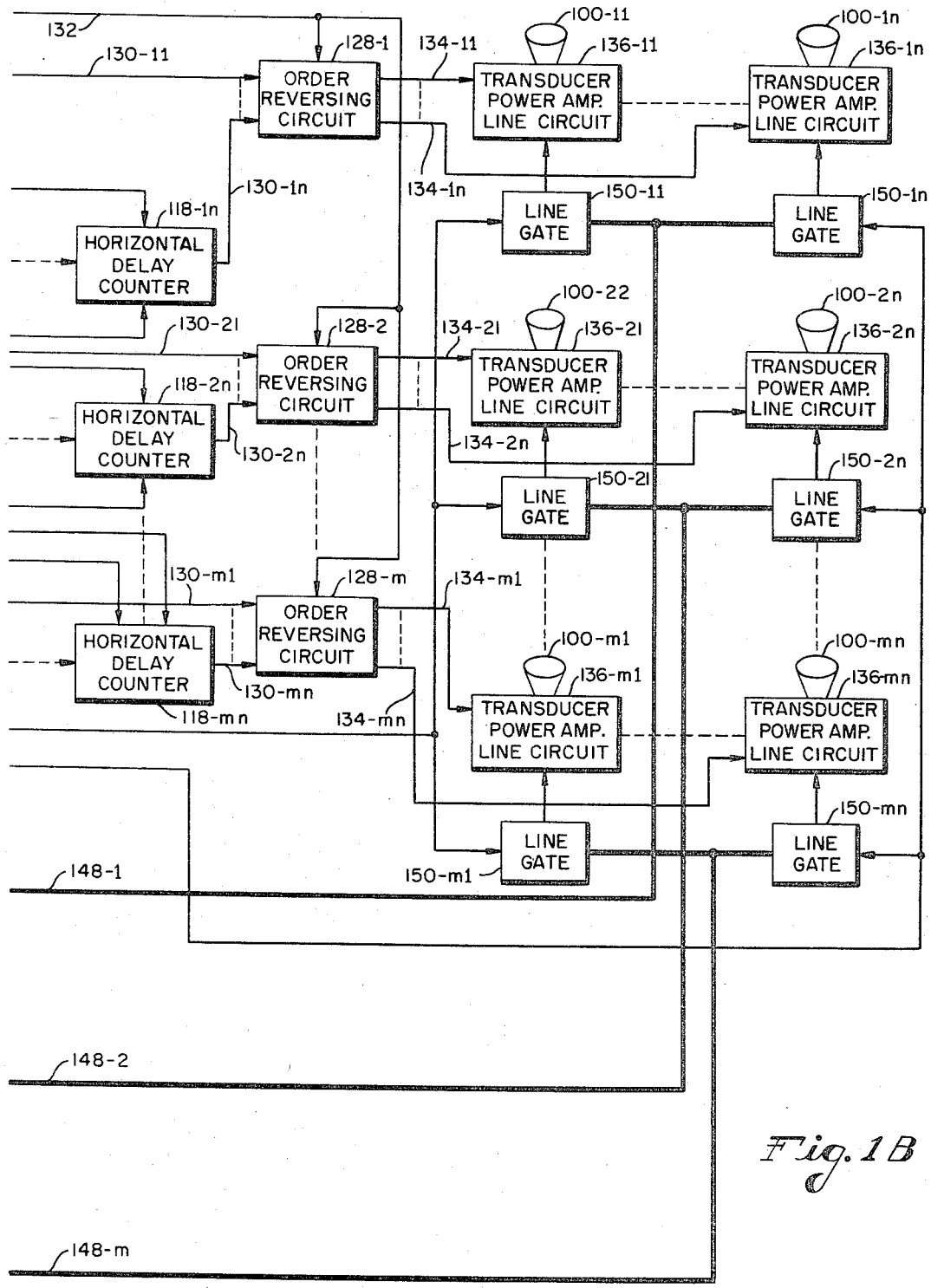

Referring to FIGS. 1A and 1B, there is diagrammatically shown a planar array of sonar transducers arranged in $m$ rows and $n$ columns, namely, transducers 100–11 . . . 100–1$n$; 100–21 . . . 100–2$n$; . . .; 100–$m$1 . . . 100–$mn$. The spacing between adjacent columns of transducers is equal and the spacing between adjacent rows of transducers is equal, but the column spacing and the row spacing are not necessarily equal to each other.

The phase control system for producing a variable direction beam from this planar array of transducers is synchronized by clock pulses having a very high frequency, such as 15 mc., for instance, from clock pulse generator 102. Audio and time slot frequency pulse generators 104 to which clock pulses are applied may consist of a plurality of clock pulse frequency dividers or a plurality of clock pulse synchronized multivibrators. In any event, control means 106, which either manually and/or automatically supplies all control information, provides audio and time slot frequency pulse generators 104 with information as to the desired value of audio frequency. This information is utilized to either control the tuning of an individual clock pulse synchronized multivibrator or the divisor of an individual frequency divider, as the case may be, in block 104. In this manner, audio pulses having a variable frequency which may be made equal to twice any desired audio frequency are produced on conductor 108. The desired audio frequency is always an exact integral multiple of the clock pulse repetition period. In addition, block 104 includes similar means for producing time slot pulses at some fixed integral multiple of the clock pulse repetition period, such as at a frequency of 1 mc., which appear on conductor 110.

The audio pulses on conductor 108 are applied as a first input to AND gate 112. Audio pulse timer 114, under the control of control means 106, applies an enabling signal as a second input to AND gate 112 only during intermittent transmitting periods, each of which may be in the order of seconds. Each transmitting period, under the control of audio pulse timer 114, is followed by a receiving period, which also may be in the order of seconds, during which a disabling signal is applied as a second input to AND gate 112. Therefore, only during each transmitting period are the audio pulses on conductor 108 forwarded through AND gate 112 to conductor 116.

As shown in FIGS. 1A and 1B, there are $m$ rows and $n$ columns of horizontal delay counters, namely, horizontal delay counters 118–11 . . . 118–1$n$; 118–21 . . . 118–2$n$; . . .; 118–$m$1 . . . 118–$mn$. Furthermore, there is a single column of vertical delay counters, namely, vertical delay counters 120–2 . . . 120–$m$.

As shown, the audio pulses appearing on conductor 116 are applied as a first input to horizontal delay counter 118–11 and as a first input to vertical delay counter 120–2. The vertical delay counters are connected in a chain, i.e., the output of vertical delay counter 120–2 is applied as a first input to vertical delay counter 120–3 (not shown), the output of vertical delay counter 120–3 (not shown) is connected as a first input to vertical delay counter 120–4 (not shown) . . ., and the output of vertical delay counter 120–($m$–1) (not shown) is connected as a first input to vertical delay counter 120–$m$. In addition, the output of each vertical delay counter in the chain of vertical delay counters is applied as a first input to the first column horizontal delay counter of the corresponding row, i.e., the output of vertical delay counter 120–2 is applied as a first input to horizontal delay counter 118–21 . . ., and the output of vertical delay counter 120–$m$ is applied as a first input to horizontal delay counter 118–$m$1.

In a similar manner, each row of horizontal delay counters is arranged in a chain, i.e., the output of horizontal delay counter 118–11 is applied as a first input to horizontal delay counter 118–12 (not shown) . . ., and the output of horizontal delay counter 118–1($n$–1) is applied as a first input to horizontal delay counter 118–22 (not shown) the output of horizontal delay counter 118–21 is applied as a first input to horizontal delay counter 118–1$n$; and shown) . . ., and the output of horizontal delay counter 118–2($n$–1) (not shown) is applied as a first input to horizontal delay counter 118–2$n$; . . ., and the output of horizontal delay counter 118–$m$1 is applied as a first input to horizontal delay counter 118–$m$2 (not shown) . . ., and the output of horizontal delay counter 118–$m$($n$–1) (not shown) is applied as a first input to horizontal delay counter 118–$mn$.

In addition, clock pulses from clock pulse generator 102 are applied over conductor 122 in common as a second input to all the vertical delay counters and all the horizontal delay counters. Further, control means 106 applies over conductor 124 beam direction information as to the vertical phase delay between adjacent rows of transducers which is applied in common as a third input to all of the vertical delay counters, and applies over conductor 126 beam direction information as to the horizontal phase delay between adjacent columns of transducers which is applied in common as a third input to all of the horizontal delay counters.

Figure 2:
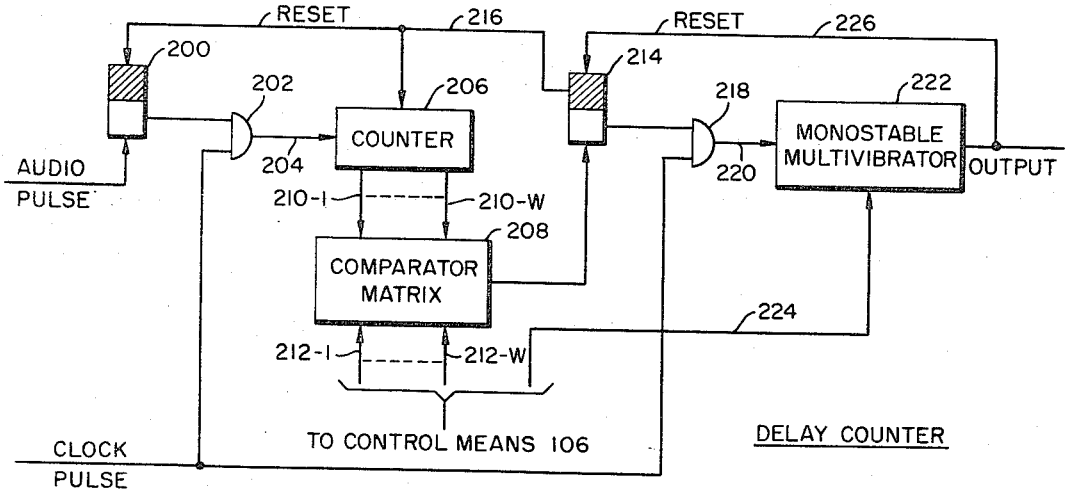
FIG. 2 is a block diagram showing the details of each delay counter utilized in the embodiment shown in FIGS. 1A and 1B.

Each of the delay counters, whether horizontal or vertical, includes the same structure, which structure is shown in FIG. 2.

Referring to FIG. 2, the audio pulse which is applied as a first input to a delay counter is effective in setting flip-flop 200. When flip-flop 200 is set, AND gate 202 is enabled to permit clock pulses applied as a second input to the delay counter to be applied as an input over conductor 204 to counter 206. The count manifested by counter 206, which is advanced in response to each clock pulse applied thereto, is applied to comparator matrix 208 as a unique set of markings on conductors 210–1 . . . 210–$w$. The third input to the delay counter from control means 106, which provides beam direction information, includes a command count which is a function, as the case may be, of the desired vertical or horizontal phase delay which is applied to comparator matrix 208 as a unique set of markings on conductors 212–1 . . . 212–$w$. In response to the count manifested by counter 206 becoming identical to the command count, comparator matrix 208 produces an output signal which is applied to flip-flop 214 to effect the setting thereof. In response to the setting of flip-flop 214, flip-flop 200 and counter 206 are reset by a coincident reset pulse applied thereto from flip-flop 214 over conductor 216. The setting of flip-flop 214 also results in enabling AND gate 218 which when enabled forwards clock pulses applied thereto to conductor 220. The clock pulses forwarded to conductor 220 are applied as a set input to monostable multivibrator 222. Monostable multivibrator 222 when set remains in its set condition for a time which is determined by the control bias potential applied thereto over conductor 224, which is included in the third input applied to the delay counter from control means 106. The level magnitude of this control bias is a function of either the desired vertical or horizontal phase delay, as the case may be, depending on whether the delay counter is a vertical or horizontal delay counter. The time interval in which monostable multivibrator 222 remains in its set condition is continuously variable under the control of this control bias up to a maximum of approximately twenty clock pulse periods. At the end of this time interval, monostable multivibrator 222 automatically resets itself and in doing so produces an output pulse which is coincident in time with the resetting thereof. This output pulse, which is applied as a reset pulse over conductor 226 to effect the resetting of flip-flop 214, also represents the output of the delay counter. It will be seen that this output pulse from a delay counter is produced after a time delay with respect to the audio pulse applied as a first input thereto, which time delay is solely a function of the predetermined fixed clock pulse frequency and the variable beam direction information received as the third input to the delay counter from control means 106. Thus, an output pulse from the delay counter will be produced in response to each applied audio pulse, so that there will be produced at the output of a delay counter a delayed audio pulse train having the same pulse repetition rate as the audio pulse train applied as a first input to the delay counter. Since, as previously described, the delay counters are arranged in chains, the delayed audio pulse train appearing at the output of any delay counter serves as the audio pulse first input to the next succeeding delay counter in the chain. Therefore, the successive delays provided by each delay counter in a chain will be cumulative.

Referring back to FIGS. 1A and 1B, there is shown an order reversing circuit corresponding to each row, namely, order reversing circuits 128–1 . . . 128–m. As shown, the outputs of the respective horizontal delay counters of each row are individually connected as inputs to the corresponding one of the order reversing circuits, i.e., horizontal delay counters 118–11 . . . 118–1n are connected as respective inputs to order reversing circuit 128–1 over conductors 130–11 . . . 130–1n; horizontal delay counters 118–21 . . . 118–2n are connected as respective inputs to order reversing circuit 128–2 over conductors 130–21 . . . 130–2n; . . .; and horizontal delay counters 118–m1 . . . 118–mn are connected as respective inputs to order reversing circuit 128–m over conductors 130–m1 . . . 130–mn. Conductor 132 applies a control signal in common from control means 106 to all of order reversing circuits 128–1 . . . 128–m.

When a beam direction in the first quadrant is selected by control means 106, each order reversing circuit couples the input conductors thereof to the output conductors thereof in the same order, i.e., for instance, in the case of order reversing circuit 128–1, conductor 130–11 is coupled to conductor 134–11 . . . and 130–1n is coupled to conductor 134–1n. When a beam direction in the second quadrant is selected by control means 106, each order reversing circuit couples the input conductors thereof to the output conductors thereof in reversed order, i.e., for instance, in the case of order reversing circuit 128–1, conductor 130–11 is coupled to conductor 134–1n . . . and 130–1n is coupled to conductor 134–11. Each order reversing circuit merely consists of two sets of AND gates, either one of which is opened and the other one of which is closed under the control of control means 106.

As shown in FIGS. 1A and 1B, each output conductor of each order reversing circuit is connected as a first input to the corresponding one of the transducer, power amplifier, line circuits, i.e., conductors 134–11 . . . 134–1n are respectively connected as first inputs to transducer, power amplifier, line circuits 136–11 . . . 136–1n; conductors 134–21 . . . 134–2n are respectively connected as first inputs to transducer, power amplifier, line circuits 136–21 . . . 136–2n; . . .; and conductors 134–m1 . . . 134–mn are respectively connected as first inputs to transducer, power amplifier, line circuits 136–m1 . . . 136–mn. In this manner, signals having the desired audio frequency and proper relative phase in accordance with desired beam direction are applied to each of the transducer, power amplifier, line circuits.

However, it is also necessary to control the relative amplitude of each audio signal to be transmitted by each transducer in accordance with the selected beam direction. This is accomplished in the embodiment shown in FIGS. 1A and 1B by providing output level store 138, which may be a pre-programmed multichannel magnetic drum or core store, for instance, which obtains information as to the desired beam direction from control means 106 over conductor 140 and which is synchronized by the time slot pulses on conductor 110. The time slot pulses on conductor 110 are also applied to time slot counter 142, which acts as a commutator or steering circuit for cyclically forwarding time slot pulses in sequence to each of individual conductors 144–1 . . . 144–n, to thereby produce a repetitive time frame each including n time slots. Output level store 138 in accordance with its program and the beam direction information received thereby provides, during each time slot of each time frame, a control pulse for opening some one of k normally closed level gates associated with each row of transducers, i.e., normally closed level gates 146–11 . . . 146–1k are associated with the top row of transducers; normally closed level gates 146–21 . . . 146–2k are associated with the second row of transducers; . . .; normally closed level gates 146–m1 . . . 146–mk are associated with the bottom row of transducers. Each level gate associated with any one row, when opened, applies a distinct one of k different voltage levels, V1 . . . Vk, to that one of common transmission highways 148–1 . . . 148–m corresponding to that row.

During each time frame the successive time slot pulses appearing on conductors 144–1 . . . 144–n are effective in sequentially opening the line gates, 150–11 . . . 150–1n associated with the top row; 150–21 . . . 150–2n associated with the second row; . . .; and 150–m1 . . . 150–mn associated with the bottom row, so as to apply the selected ones of voltage levels V1 . . . Vk for each row as a second input to the appropriate one of the transducer, power amplifier, line circuits of that row in accordance with conventional time division multiplex techniques.

Figure 3:
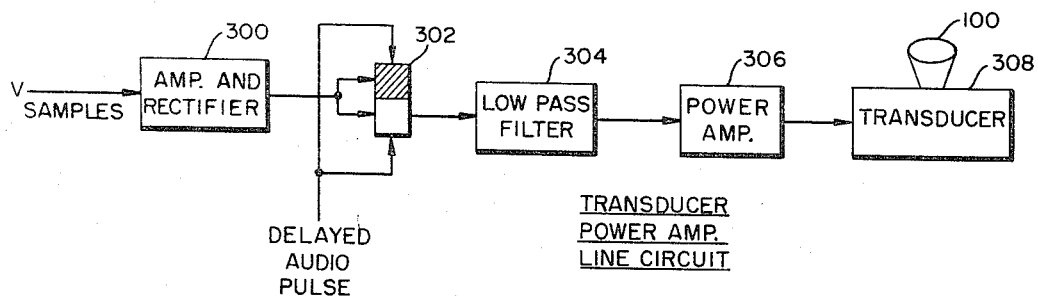
FIG. 3 is a block diagram showing the details of each transducer, power amplifier, line circuit utilized in the embodiment shown in FIGS. 1A and 1B.

Referring now to FIG. 3, which illustrates the details of each of the transducer, power amplifier, line circuits, the variable level voltage sample pulses arriving once during each time frame and applied as a second input to each transducer, power amplifier, line circuit are amplified and then rectified by block 300 to provide a D.C. voltage output therefrom which has a level which is proportional to the level of the applied voltage sample pulses. This D.C. output voltage is utilized as the power supply voltage for flip-flop 302. The delayed audio pulse train, which is applied as a first input to each transducer, power amplifier, line circuit, is, as hsown, applied as both a set and reset input to flip-flop 302. As will be remembered, the pulse repetition rate of the audio pulse train is twice that of the desired audio frequency. Flip-flop 302 will be switched to its set condition in response to each odd pulse of the audio pulse train applied thereto and will be switched to its reset condition in response to each even pulse of the audio pulse train applied thereto. Therefore, flip-flop 302 will produce a square wave output having a fundamental frequency which is equal to one-half of the pulse repetition rate of the audio pulse train, i.e., exactly equal to the desired audio frequency. Furthermore, the amplitude of the audio square wave which is produced will be determined by the level of the voltage supplied thereto from the output of amplifier and rectifier 300. This audio square wave is applied to low-pass filter 304 which passes only the fundamental frequency thereof to produce at its output a sinusoidal audio wave of the proper desired frequency and phase. The sinusoidal audio wave is amplified by power amplifier 306 and then applied to transducer circuit 308 associated with transducer 100. Transducer 100 converts the applied sinusoidal audio wave from electrical energy to sonic energy.

Although, as shown in FIG. 3, the level of the signal is controlled by applying the D.C. voltage output of amplifier and rectifier 300 as the power supply voltage of flip-flop 302, the level of the signal could also be controlled by applying the D.C. voltage output of amplifier and rectifier 300 as the power supply voltage of power amplifier 306, rather than flip-flop 302.

Although the embodiment of the invention shown in FIGS. 1A and 1B utilizes a single vertical delay counter for each row other than the top row and a plurality of horizontal delay counters connected in a chain for each row, it will be seen that the same results could be obtained by utilizing a single horizontal delay counter for each column other than the first column and utilizing a plurality of vertical delay counters connected in a chain for each column.

Figure 4:
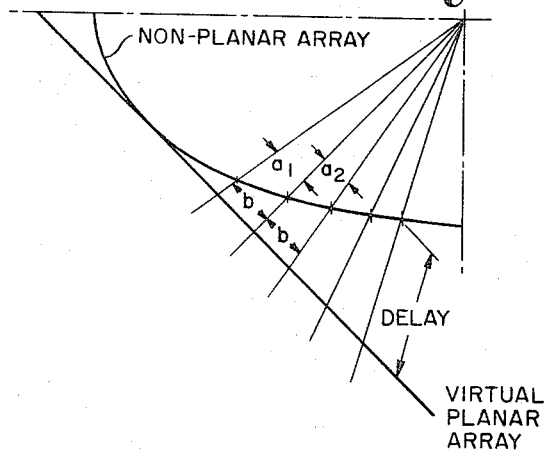
FIG. 4 illustrates the relationships of a non-planar array with a virtual planar array produced therefrom.

The basic preferred embodiment shown in FIGS. 1A and 1B is for use with a physically planar array. At times the actual physical array is not planar but has some other shape, such as elliptical, for instance. As shown in FIG. 4, a virtual planar array, wherein the effective distance $b$ between adjacent transducers on the virtual planar array is equal, may be derived from an actual non-planar array by locating the physical transducers of the non-planar array at unequal distances "$a_1, a_2 \ldots$" from each other and providing an appropriate fixed delay for each transducer. More prticularly, as shown in FIG. 4, the distances "$a_1, a_2 \ldots$" may be determined by choosing a line in accordance with the desired location of the virtual planar array, laying out equidistant points on this line, the distance between adjacent points being $b$, drawing straight lines between these points and the origin of the non-planar array, and locating the transducers at the intersection of these straight lines and the non-planar array. The distance between the position of a transducer on the non-planar array and the point corresponding thereto on the virtual planar array manifests a fixed time delay which is equal to this distance divided by time velocity of sound in the surrounding medium.

The embodiment shown in FIGS. 1A and 1B may be easily modified to provide this needed fixed delay for each transducer merely by incorporating in counter 206 of each individual horizontal delay counter an individual predetermined preliminary count which, at the clock pulse frequency being utilized, will provide a first predetermined fixed delay, independent of beam direction, which will approximate the needed predetermined delay for that delay counter. By adjusting the fixed bias on monostable multivibrator 222 of that delay counter, a second fixed delay may be obtained which when added to the first predetermined fixed delay for that delay counter will make the total fixed delay exactly equal to the needed predetermined delay for that delay counter.

Even when the physical array is planar, under certain conditions it may be desirable to use fixed delays to produce a virtual planar array at some fixed angle, such as 45°, with respect to the physical planar array. This is because steering steps are relatively crude toward end-fire with respect to steering steps closer to broadside of the array. For instance, with a 15 mc. clock, it is possible to obtain steering steps of approximately 0.2° when the angle of the planar array and the direction of the beam is between 30° and 45°, while if this angle is less than 10° the smallest steering steps obtainable are greater than 0.5°. By providing a virtual array at 45° with respect to the physical array, a substantially end-fire beam makes an angle of close to 45° with respect to the virtual array, rather than the angle of close to 0° which it makes with respect to the physical array.

Although for illustrative purposes, only certain basic embodiments of the present invention have been shown. It is realized that it is within the skill of the art to add various subsidiary features, such as frequency modulation of the audio square wave by varying the frequency of the audio square wave under the control of control means 106, amplitude modulation of the audio wave by refinement of output level store 126 so that the output level is not only a function of beam direction but is a function of an applied modulation frequency, any of which may be desirable in a sophisticated sonar system. Therefore, it is intended that the present invention not be restricted to the specific embodiments disclosed, but that it be limited only by the true spirit and scope of the appended claims.

What is claimed is:

1. A phase control system for a two-dimensional fixed transmitting array composed of a plurality of individual transducers arranged in a first number of rows and a second number of columns; said system comprising a clock pulse source for generating clock pulses at a predetermined pulse repetition period; means synchronized by said clock pulses for generating signal pulses having a period which is a given integral multiple of said predetermined period; a first serial group of delay counter means at least equal in number to one less than one of said first and second numbers, second serial groups of delay counter means, the number of delay counter means included in each of said second serial groups being equal to the other of said first and second numbers; each of said delay counter means including a normally disabled counter, input means coupled to said counter to effect the enabling thereof in response to a pulse applied to a first input of that delay counter means, said counter being effective when enabled in counting pulses applied as a second input to that delay counter means, and output means coupled to said counter for producing an output pulse in response to said counter achieving a selected count determined by a selection signal applied to a third input of that delay counter means; means for applying said signal pulses to said first input of the first one of said first serial group of delay counter means and to the first one of the first of said second serial groups of delay counter means; means for applying said clock pulses as said second input to all of said delay counter means of both said first and all of said second serial groups, control means for applying a first selection signal to all of said delay counter means of said first serial group and for applying a second selection signal to all of said delay counter means of all of said second serial groups, means for applying said output pulse of each of said delay counter means of said first serial group to the input of the next succeeding delay counter means thereof and to the input of the first delay counter means of the next succeeding second serial group, and means for applying said output pulse of each of said delay counter means of each second serial group to the input of the next succeeding delay counter means of that second serial group; an individual line circuit corresponding with each of said transducers comprising a bistable device for producing a first level of potential when in its first stable condition and a second level of potential when in its second stable condition, whereby there is formed an individual group of line circuits corresponding with each of said second serial groups; and coupling means for applying the output pulses from each individual one of said delay counter means of each of said second serial groups to a predetermined individual one of said line circuits of the group thereof which corresponds with that second serial group to switch said bistable device thereof from its first to its second stable condition in response to each odd output pulse applied thereto and to switch said bistable device thereof from its second to its first stable condition in response to each even output pulse applied thereto, whereby a square wave having a fundamental frequency equal to one-half the pulse repetition rate of said signal pulses is produced at the output of each bistable device, and wherein each line circuit further comprises means including a low-pass filter for passing only the fundamental frequency of said square wave produced by the bistable device thereof for applying a sinusoidal wave corresponding to that square wave to the transducer with which that line circuit corresponds.

2. The system defined in claim 1, wherein said control means includes means for selecting said first and second selection signals in accordance with the desired angular direction of a beam to be transmitted from said array.

3. The system defined in claim 2, including level determining means coupled to said control means for controlling the relative amplitudes of the respective sinusoidal waves applied to the respective transducers in accordance with said desired angular direction.

4. The system defined in claim 3, wherein said level determining means includes a plurality of separate points of different fixed potential, time division multiplex means including an output level store controlled by said control means for coupling said line circuits respectively to selected ones of said separate points in accordance with said desired angular direction, and power supply means within each line circuit responsive to the value of the fixed potential of the selected point coupled to that line circuit for controlling the amplitude of the sinusoidal wave emanating from that line circuit in accordance therewith.

5. The system defined in claim 4, wherein said power supply means within each line circuit includes means to derive a direct current voltage having a magnitude proportional to said value of the fixed potential of the selected point coupled to that line circuit and means for applying said direct current voltage as the supply voltage for the bistable device of that line circuit.

6. The system defined in claim 2, wherein said coupling means includes an individual order reversing means corresponding with each of said second serial groups coupled to said control means for respectively applying the output pulses from the delay counter means of the second serial group with which it corresponds to the respective line circuits of the group which corresponds to that second serial group in a first predetermined order when said desired angular direction lies in the first quadrant and for applying the output pulses from the delay counter means of the second serial group with which it corresponds to the respective line circuits of the group which corresponds to that second serial group in a second predetermined order which is the reverse of said first predetermined order when said desired angular direction lies in the second quadrant.

7. The system defined in claim 1, wherein said array is a planar array with adacent transducers in each row being equally spaced from each other and with adjacent transducers in each column being equally spaced from each other.

8. The system defined in claim 1, wherein each of said delay counter means of each second serial group corresponds with a separate transducer, and further including virtual plane producing means for producing a virtual plane displaced from said array composed of an individual point in said virtual plane corresponding to each transducer in said array wherein adjacent points in each row are equally spaced from each other and adjacent points in each column are equally spaced from each other, said virtual plane producing means comprising delay means in each delay counter means of each second serial group for producing a fixed delay component which is independent of said second selection signal between the application of a pulse to the first input thereof and the derivation of an output pulse therefrom, the length of said fixed delay component produced by each delay counter means of each second serial group being equal to the displacement of the separate transducer with which that delay counter means corresponds from the point in said virtual plane corresponding to that transducer divided by the velocity of propagation of transmitted energy in the medium surrounding said array.

9. The system defined in claim 8, wherein said output means of each delay counter means of each second serial group includes a monostable multivibrator which in response to being triggered produces said output pulse therefrom after a given delay which has a length which is a single-valued function of a bias potential applied to said multivibrator, and means responsive to said counter of that delay counter means achieving said selected count for triggering said monostable multivibrator, and wherein said delay means in each delay counter means of each second serial group includes means for setting said counter thereof to an initial preliminary predetermined count individual thereto which is independent of said second selection signal and for applying a fixed component of bias potential to said monostable multivibrator thereof having a predetermined value individual thereto such that the sum of the given delay produced by said monostable multivibrator thereof when said bias potential applied thereto has said predetermined value and a delay equal to said initial preliminary predetermined count to which said counter thereof is set multiplied by said predetermined period of said clock pulses is equal to said fixed delay component produced by that delay counter means.

10. The system defined in claim 8, wherein said array is non-planar, and wherein each transducer of said array is positioned at the intersection of said array with a line connecting the point of said virtual plane corresponding to that transducer with a common point on the other side of said array from said virtual plane.

11. The system defined in claim 1, wherein said output means of each delay counter means includes a monostable multivibrator which in response to being triggered produces said output pulse therefrom after a given delay which has a length which is a single-valued function of a bias potential applied to said multivibrator, means for controlling the value of said bias potential in accordance with said selection signal applied as a third input to that delay counter means, and means responsive to the counter of that delay counter means achieving said selected count for triggering said monostable multivibrator.

12. The system defined in claim 1, wherein each of said delay counter means includes means responsive to the counter of that delay counter means achieving said selected count for resetting and disabling the counter thereof.

13. The system defined in claim 1, further including an audio pulse timer means coupled to said means for applying said signal pulses for effecting the enabling thereof solely during intermittent transmitting time periods, the initiation and length of said transmitting time periods being controlled by said timer means.

14. A phase control system for a two dimensional fixed transmitting array composed of a plurality of individual transducers arranged in a first number of rows and a second number of columns, said system comprising
(a) a first serial group of delay counter means at least equal in number to one less than one of said first and said second numbers,
(b) second serial groups of delay counter means, the number of delay counter means included in each of said second serial groups being equal to the other of said first and said second numbers,
(c) means included in each of said delay counter means for producing an output pulse in response to a selected count determined by a selection signal applied to an input of that delay counter means,
(d) control means for applying the selection signals to all of said delay counter means,
(e) means for applying input pulses to at least the input of the first delay counter means of said first serial group,
(f) means for applying said output pulse of each of said delay counter means of said first serial group to the input of the next succeeding second serial group,
(g) means for applying said output pulse of each of said delay counter means of said second serial group to the input of the next succeeding delay counter means of that second serial group, (h) an individual line circuit corresponding to each of said transducers comprising a bi-stable device for producing a first level of potential when in its first stable condition and a second level of potential when in its second stable condition, and (i) coupling means for applying the output pulses from each individual one of said delay counter means of at least said second serial groups to separate ones of said line circuits to switch said bi-stable devices thereof between their first and second stable conditions in response to output pulses applied thereto from their corresponding counter means for applying sinusoidal waves to the transducers.

15. The invention as set forth in claim 14 further comprising a clock pulse source for generating clock pulses having a predetermined pulse repetition period, and wherein each of said delay counter means includes a normally disabled counter, input means coupled to said counter to effect the enabling thereof in response to a pulse applied to a first input of that delay counter means, said counter being effective when enabled in counting pulses applied as a second input to that delay counter means, and means for applying said clock pulses to said second input to achieve said selected count.

16. The invention as set forth in claim 15 including means synchronized by said clock pulses for generating signal pulses having a period which is a given integral multiple of said clock pulse repetition period, means for applying said signal pulses to said first input of the first one of said first serial group of delay counter means and to the first one of the first of said second serial groups of delay counter means, said signal pulses propagating through said delay counter means as said output pulses thereof.

17. The invention as set forth in claim 14 including level determining means coupled to said control means for controlling the relative amplitudes of the respective sinusoidal waves applied to the respective transducers.

18. The invention as set forth in claim 17 wherein said level determining means includes a plurality of separate points of different fixed potential, time division multiplex means including an output level store controlled by said control means for coupling said line circuits respectively to selected ones of said separate points in accordance with the desired angular direction of the beam to be transmitted by said array and means within each line circuit responsive to the value of the fixed potential of the selected point coupled to that line circuit for controlling the amplitude of the sinusoidal wave emanating from that line circuit in accordance therewith.

19. The invention set forth in claim 15 wherein said coupling means includes order reversing means corresponding with each of said second serial groups and coupled to said control means for respectively applying the output pulses from the delay counter means of the second serial group with which it corresponds to the respective line circuits of the group which corresponds to that second serial group in different predetermined orders.

20. The invention as set forth in claim 14 wherein said array is a planar array with adjacent transducers in each row equally spaced from each other and with adjacent transducers in each column equally spaced from each other.

21. The invention as set forth in claim 14 wherein each of said delay counter means of each second serial group corresponds with a separate transducer and further including virtual plane producing means for producing a virtual plane displaced from said array, said virtual plane producing means comprising means in each delay counter means of at least each second serial group for inducing a fixed delay component between the application of a pulse to the input thereof and the derivation of an output pulse therefrom.

22. A system for steering the directional pattern of a transducer array wherein transducers are arranged in rows and columns, said system comprising (a) an array of delay counter means each corresponding to a different one of said transducers and arranged in rows and columns, (b) means connecting the counters in each of said rows and columns in series relationship so that an input pulse applied to the first counter means in one corner of said rows and columns propagates through all of said counter means, (c) a plurality of line circuits each corresponding to a different one of said transducers and each being responsive to output pulses from different ones of said counter means, said line circuits, each including a bi-stable device for producing a first level of potential when in its first stable state and a second level of potential when in its second stable state to produce a square wave when said bi-stable device is switched between its stable states and a low pass filter for passing only the fundamental of said square wave for applying a sinusoidal wave to the transducer to which that line circuit corresponds, (d) digital control means for presetting said delay counter means to control the direction of said pattern.

References Cited
UNITED STATES PATENTS 3,266,010   8/1966   Brightman et al. _____ 340—5

RODNEY D. BENNETT, *Primary Examiner.*

RICHARD A. FARLEY, *Examiner.*